(12) United States Patent
Shin et al.

(10) Patent No.: US 8,274,616 B2
(45) Date of Patent: Sep. 25, 2012

(54) ARRAY SUBSTRATE FOR LIQUID CRYSTAL DISPLAY DEVICE AND METHOD OF MANUFACTURING THE SAME

(75) Inventors: Dong-Uk Shin, Seoul (KR); Kyung-Tae Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 106 days.

(21) Appl. No.: 12/318,049

(22) Filed: Dec. 19, 2008

(65) Prior Publication Data
US 2009/0310048 A1    Dec. 17, 2009

(30) Foreign Application Priority Data

Jun. 12, 2008  (KR) .................. 10-2008-0055370

(51) Int. Cl.
*G02F 1/1343*  (2006.01)
(52) U.S. Cl. .......................... 349/39; 349/141
(58) Field of Classification Search .............. 349/38–39, 349/141
See application file for complete search history.

(56) References Cited

U.S. PATENT DOCUMENTS
2004/0095519 A1*  5/2004  Kim et al. ................. 349/43
2005/0099579 A1*  5/2005  Yoo et al. ................. 349/155
2005/0219436 A1*  10/2005 Kwon et al. ................ 349/44
2008/0094532 A1*  4/2008  Ho et al. ................... 349/39
2009/0001377 A1*  1/2009  Chen et al. ................ 257/66

FOREIGN PATENT DOCUMENTS
JP       2002-151699       5/2002
* cited by examiner

*Primary Examiner* — Jessica M Merlin
(74) *Attorney, Agent, or Firm* — McKenna Long & Aldridge LLP

(57) ABSTRACT

A LCD device including a substrate, first and second gate lines along a first direction, first through third data lines along a second direction and crossing the first and second gate lines to define first and second pixel regions, first and second TFTs at a crossing of the second gate line and the first data line and a crossing of the second gate line and the second data line, first and second pixel electrodes in the first and second pixel regions, the first pixel electrode connected to the first TFT and the second pixel electrode connected to the second TFT, and first and second common lines between the first and second gate lines and overlapping the first and second pixel electrodes, and connected to each other under the second data line to cover a part of the second data line between the first and second gate lines.

14 Claims, 9 Drawing Sheets

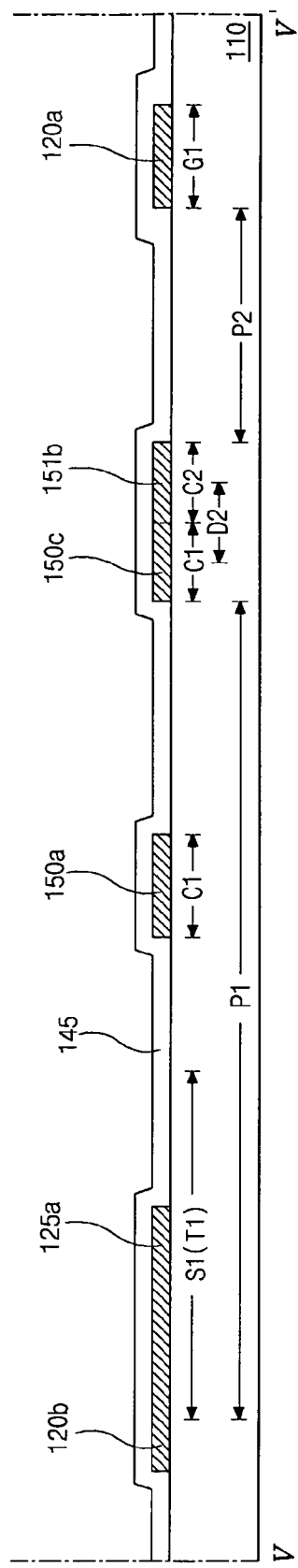
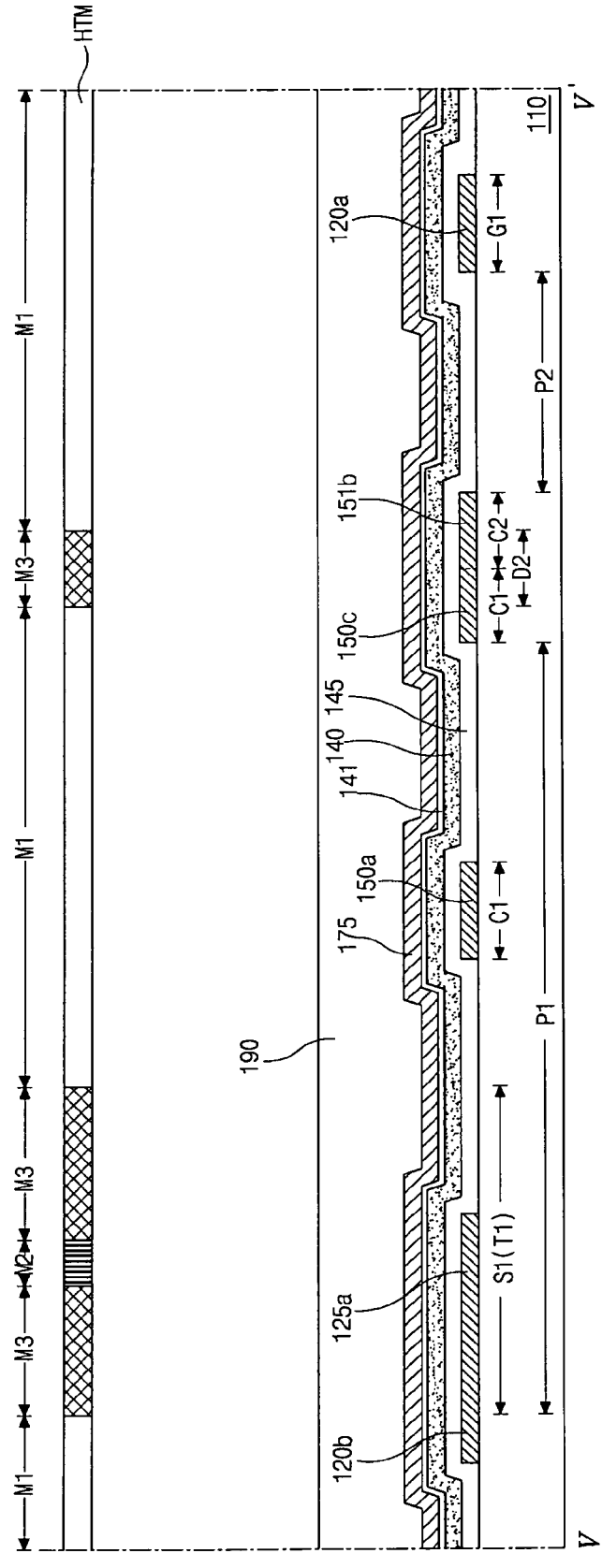
FIG. 5A
FIG. 5B

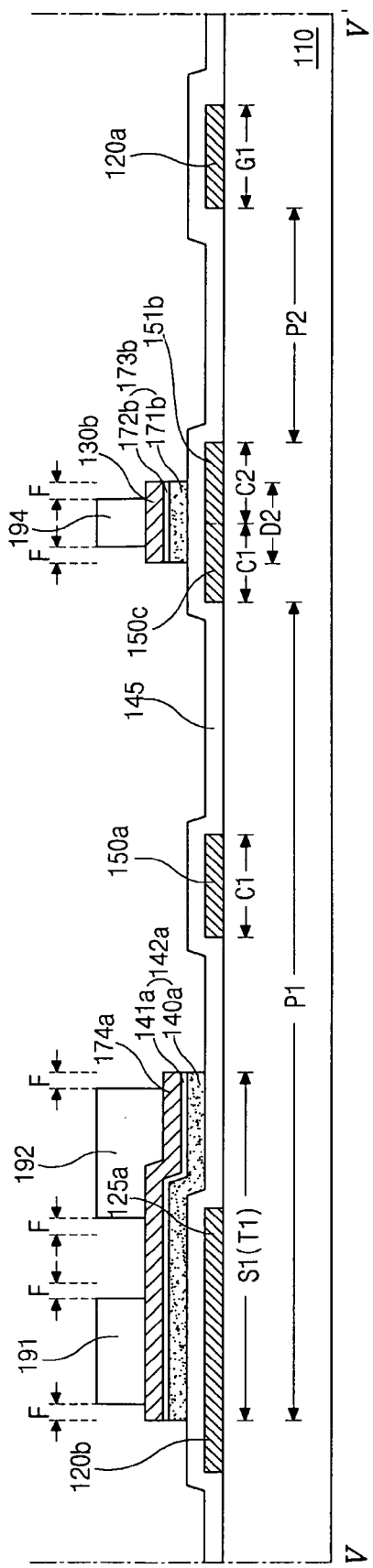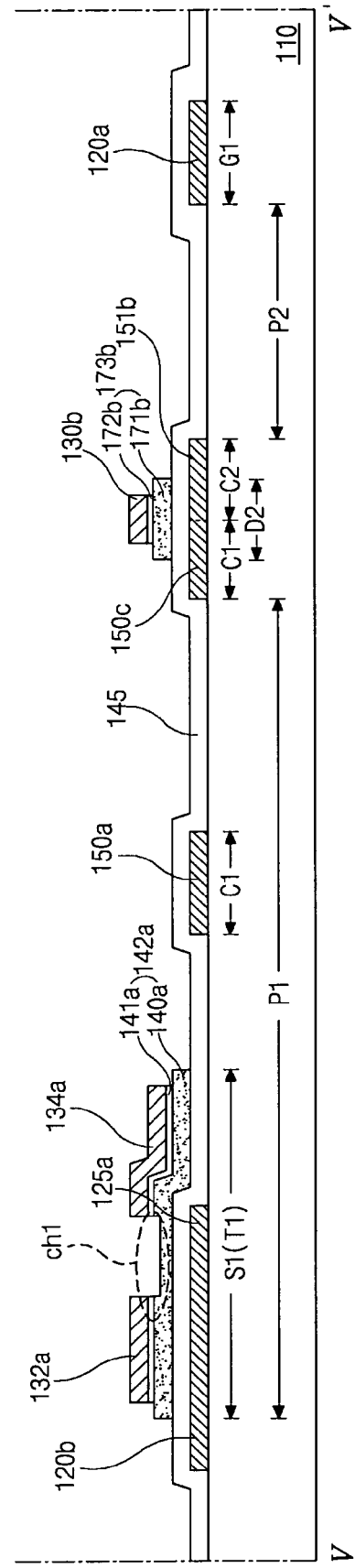
FIG. 5E
FIG. 5F

ARRAY SUBSTRATE FOR LIQUID CRYSTAL DISPLAY DEVICE AND METHOD OF MANUFACTURING THE SAME

The invention claims the benefit of Korean Patent Application No. 10-2008-0055370 filed in Korea on Jun. 12, 2008, which is hereby incorporated by reference for all purposes as if fully set forth herein.

BACKGROUND OF THE INVENTION

1. Field of the Invention

The invention relates to a liquid crystal display device, and more particularly, to an array substrate for a liquid crystal display device and a method of manufacturing the same.

2. Discussion of the Related Art

Liquid crystal display (LCD) devices use the optical anisotropy and polarization properties of liquid crystal molecules of a liquid crystal layer to produce an image. The liquid crystal molecules have long, thin shapes, and the liquid crystal molecules can be arranged along a certain direction. The alignment direction of the liquid crystal molecules can be controlled by varying the intensity of an electric field applied to the liquid crystal layer. Accordingly, the alignment of the liquid crystal molecules is changed by the electric field. Light is transmitted and refracted according to the alignment of the liquid crystal molecules to display an image.

A liquid crystal display device includes a color filter substrate having a common electrode, an array substrate having a pixel electrode, and a liquid crystal layer interposed between two substrates. The liquid crystal display device is driven by a vertical electric field induced between the common electrode and the pixel electrode and has superior transmittance and aperture ratio.

The pixel electrode of the array substrate and the common electrode of the color filter substrate form a liquid crystal capacitor. A voltage applied to the liquid crystal capacitor is not maintained until a next signal is provided and is leaked. Accordingly, to maintain the applied voltage, a storage capacitor is connected to the liquid crystal capacitor.

Generally, the storage capacitor can be formed by two methods. One method may be referred to as a storage-on-common or independent storage capacitor type, in which an electrode for the storage capacitor is further formed and is connected to the common electrode. The other method may be referred as a storage-on-gate or previous gate type, in which a part of an (n−1)th gate line is used as an electrode for the storage capacitor of an nth pixel.

The storage-on-gate type has an advantage that an outer storage line is not needed because a signal for the storage capacitor is applied through the gate line. However, the storage-on-gate type has a disadvantage in that there is signal interference due to coupling with a gate signal.

On the other hand, the storage-on-common (SOC) type has an advantage in that there is no signal interference in the gate signal and an enough storage capacitance can be secured. However, a storage line is further formed, and this causes a decrease in the aperture ratio.

A related art SOC type liquid crystal display (LCD) device will be explained with reference to the accompanying drawings.

FIG. 1 is a plan view illustrating an array substrate for an SOC-type LCD device according to the related art.

In FIG. 1, first and second gate lines 20a and 20b and first, second, and third data lines 30a, 30b and 30c are formed on a substrate 10 in a matrix shape. The first, second and third data lines 30a, 30b and 30c cross the first and second gate lines 20a and 20b to define first and second pixel regions P1 and P2. Scan signals are applied to the first and second gate lines 20a and 20b, and data signals are applied to the first, second and third data lines 30a, 30b and 30c.

First and second common lines 50 and 51 are formed between the first and second gate lines 20a and 20b. Each of the first and second common lines 50 and 51 has an H-like shape.

The first common line 50 includes a horizontal part 50a and first and second vertical parts 50b and 50c. The horizontal part 50a is disposed in the first pixel region P1 along a horizontal direction in the context of the figure. The first and second vertical parts 50b and 50c extend from respective ends of the horizontal part 50a along a vertical direction in the context of the figure. The first and second vertical parts 50b and 50c are parallel with the data lines 30a, 30b and 30c and are adjacent to the first and second data lines 30a and 30b, respectively.

The second common line 51 also includes a horizontal part 51a and first and second vertical parts 51b and 51c. The horizontal part 51a is disposed in the second pixel region P2 along the horizontal direction in the context of the figure. The first and second vertical parts 51b and 51c extend from respective ends of the horizontal part 51a along the vertical direction in the context of the figure. The first and second vertical parts 51b and 51c are parallel with the data lines 30a, 30b and 30c and are adjacent to the second and third data lines 30b and 30c, respectively.

The second vertical part 50c of the first common line 50 is connected to the first vertical part 51b of the second common line 51 through first and second common bridge lines 53 and 54. The first and second common bridge lines 53 and 54 are repeatedly formed between adjacent pixel regions and connect the common lines in adjacent pixel regions. Accordingly, all the common lines on the substrate 10 are electrically connected to one another through the first and second common bridge lines 53 and 54, and a common signal from a common signal generating unit (not shown) is applied to all the common lines on the substrate 10.

A first thin film transistor T1 is formed at a crossing portion of the second gate line 20b and the first data line 30a. A second thin film transistor T2 is formed at a crossing portion of the second gate line 20b and the second data line 30b.

The first thin film transistor T1 includes a first gate electrode 25a, a first semiconductor layer (not shown), a first source electrode 32a and a first drain electrode 34a. The first gate electrode 25a extends from the second gate line 20b into the first pixel region P1. The first semiconductor layer (not shown) overlaps and is disposed over the first gate electrode 25a. The first source electrode 32a extends from the first data line 30a and is disposed over the first semiconductor layer. The first drain electrode 34a is spaced apart from the first source electrode 32a.

The second thin film transistor T2 includes a second gate electrode 25b, a second semiconductor layer (not shown), a second source electrode 32b and a second drain electrode 34b. The second gate electrode 25b extends from the second gate line 20b into the second pixel region P2. The second semiconductor layer (not shown) overlaps and is disposed over the second gate electrode 25b. The second source electrode 32b extends from the second data line 30b and is disposed over the second semiconductor layer. The second drain electrode 34b is spaced apart from the second source electrode 32b.

The first semiconductor layer includes a first active layer 40a of intrinsic amorphous silicon (a-Si:H) and a first ohmic contact layer (not shown) of impurity-doped amorphous silicon (n+ a-Si:H). The second semiconductor layer includes a second active layer 40b of intrinsic amorphous silicon (a-Si: H) and a second ohmic contact layer (not shown) of impurity-doped amorphous silicon (n+ a-Si:H).

First and second contact holes CH1 and CH2 expose the first and second drain electrodes 34a and 34b, respectively.

First and second pixel electrodes 70a and 70b are formed in the first and second pixel regions P1 and P2, respectively. The first pixel electrode 70a contacts the first drain electrode 34a through the first drain contact hole CH1. The second pixel electrode 70b contacts the second drain contact hole 34b through the second drain contact hole CH2. The first and second pixel electrodes 70a and 70b are formed of one selected from a transparent conductive material group including indium tin oxide (ITO) and indium zinc oxide (IZO).

A cross-sectional structure of an array substrate for an SOC-type LCD device according to the related art will be explained with reference to the accompanying drawings.

FIG. 2 is a cross-sectional view taken along the line II-II' of FIG. 1.

In FIG. 2, the first and second pixel regions P1 and P2, a first switching region S1, first and second common regions C1 and C2, and a second data region D2 are defined on the substrate 10.

The first gate electrode 25a extending from the second gate line 20b of FIG. 1 is formed on the substrate 20 including the regions P1, P2, S1, C1, C2 and D2. In addition, the second vertical part 50c of the first common line 50 and the first vertical part 51b of the second common line 51 are formed in the first and second common regions C1 and C2, respectively. The second common bridge line 54 is formed between the second vertical part 50c of the first common line 50 and the first vertical part 51b of the second common line 51. The second common bridge line 54 electrically connects the second vertical part 50c of the first common line 50 to the first vertical part 51b of the second common line 51.

A gate insulating layer 45 is formed on the first gate electrode 25a, the second vertical part 50c of the first common line 50, the first vertical part 51b of the second common line 51 and the second common bridge line 54. The gate insulating layer 45 is formed of one selected from an inorganic insulating material group including silicon oxide ($SiO_2$) and silicon nitride ($SiN_x$).

The first active layer 40a of intrinsic amorphous silicon and the first ohmic contact layer 41a of impurity-doped amorphous silicon are sequentially formed on the gate insulating layer 45 overlapping the first gate electrode 25a. The first active layer 40a and the first ohmic contact layer 41a have an island shape and constitute the first semiconductor layer 42a.

The first source electrode 32a and the first drain electrode 34a are formed on the first semiconductor layer 42a. The first source electrode 32a extends from the first data line 30a of FIG. 1. The first drain electrode 34a is spaced apart from the first source electrode 32a. In addition, the second data line 30b is formed in the second data region D2 and overlaps the second common bridge line 54.

A passivation layer 55 is formed on the first source electrode 32a, the first drain electrode 34a and the second data line 30b. The passivation layer 55 has the first drain contact hole CH1 exposing the first drain electrode 34a.

The first pixel electrode 70a and the second pixel electrode 70b are formed on the passivation layer 55. The first pixel electrode 70a is disposed in the first pixel region P1 and is connected to the first drain electrode 34a through the first drain contact hole CH1. The second pixel electrode 70b is disposed in the second pixel region P2 and is connected to the second drain electrode 34b of FIG. 1 through the second drain contact hole CH2 of FIG. 1.

Here, the second vertical part 50c of the first common line 50 and the first vertical part 51b of the second common line 51 are disposed to be as close to the second data line 30b as possible, and the second common bridge line 54 connects the second vertical part 50c of the first common line 50 and the first vertical part 51b of the second common line 51. The first pixel electrode 70a partially overlaps the first vertical part 50b of FIG. 1 and the second vertical part 50c of the first common line 50, and the second pixel electrode 70b partially overlaps the first vertical part 51b and the second vertical part 51c of FIG. 1 of the second common line 51.

However, in the above-mentioned array substrate, there is a limitation on increasing the aperture ratio.

FIG. 3 is a cross-sectional view of an SOC-type LCD device according to the related art and corresponds to a cross-section taken along the line III-III' of FIG. 1.

In FIG. 3, a color filter substrate 5 and an array substrate 10 are facing each other and attached with a cell gap g therebetween. Each of the color filter substrate 5 and the array substrate 10 includes a display area AA and a non-display area NAA. A liquid crystal layer 15 is interposed between the color filter substrate 5 and the array substrate 10. The liquid crystal layer 15 has a thickness corresponding to the cell gap g. The color filter substrate 5, the array substrate 10 and the liquid crystal layer 15 constitute a liquid crystal panel 30. A backlight unit 90 is disposed at a rear surface of the array substrate 10 as a light source.

Even though not shown in the figure, a seal pattern is formed between the color filter substrate 5 and the array substrate 10 along peripheries. The seal pattern may be formed of a thermosetting resin.

The color filter substrate 5 includes a transparent substrate 1, a black matrix 12, a color filter layer 16, an overcoat layer 14 and a common electrode 80. The black matrix 12 is formed at a lower surface of the transparent substrate 1 and blocks light incident on the non-display area NAA. The color filter layer 16 is formed on the black matrix 12 and includes a red sub color filter 16a, a green sub color filter 16b and a blue sub color filter (not shown) that are subsequently patterned. The overcoat layer 14 is formed on the color filter layer 16. The common electrode 80 is formed on the overcoat layer 14 and is formed of a transparent conductive material.

The array substrate 10 includes a transparent substrate 2, the second vertical part 50c of the first common line, the first vertical part 51b of the second common line 51, the gate insulating layer 45, the second data line 30b, the passivation layer 55, and the first and second pixel electrodes 70a and 70b. The second vertical part 50c of the first common line 50 and the first vertical part 51b of the second common line 51 are formed on an upper surface of the transparent substrate 2 and are spaced apart from each other such that the second data region D2 is disposed therebetween. The gate insulating layer 45 covers the second vertical part 50c of the first common line 50 and the first vertical part 51b of the second common line 51. The second data line 30b is disposed in the second data line D2 on the gate insulating layer 45. The passivation layer 55 covers the second data line 30b. The first and second pixel electrodes 70a and 70b are formed on the passivation layer 55 in the first and second pixel regions P1 and P2, respectively, such that the second data line 30b is disposed therebetween.

In the SOC-type LCD device, since the second vertical part 50c of the first common line 50 and the first vertical part 51b of the second common line 51 are formed under the second data line 30b, there is no poor image problem such as crosstalk, which is caused by a change of a data signal due to a parasitic capacitance between the first and second pixel electrodes 70a and 70b and the second data line 30b, even if the first and second pixel electrodes 70a and 70b are close to the second data line 30b. However, the aperture ratio is lowered because the second vertical part 50c of the first common line 50 and the first vertical part 51b of the second common line 51 are spaced apart from each other.

Moreover, the black matrix 12, which is disposed in the non-display area NAA on the lower surface of the transparent substrate 1 of the color filter substrate 5, is designed with an attachment margin of about 2 ☐m at both ends to cover the second vertical part 50c of the first common line 50 and the first vertical part 51b of the second common line 51 by considering an attachment error when the color filter substrate 5 and the array substrate 10 are attached. Accordingly, the aperture ratio is further reduced by the attachment margin.

Furthermore, in the SOC-type LCD device having a small size, for example, less than 10 inches, attempts for reducing costs have been made by increasing the aperture ratio of the liquid crystal panel 30 and removing optical sheets of the backlight 90.

However, the second vertical part 50c of the first common line 50 and the first vertical part 51b of the second common line 51 are spaced apart from each other at both sides of the second data line 30b and are connected to each other through the first and second common bridge lines 53 and 54 of FIG. 1 overlapping the second data line 30b. It is restricted to decrease a distance between the second vertical part 50c of the first common line 50 and the first vertical part 51b of the second common line 51 because of a limitation in a resolution of a light-exposing apparatus. Therefore, it is difficult to increase the aperture ratio.

Accordingly, the prevention invention is directed to an array substrate for a liquid crystal display device and method of manufacturing the same that substantially obviates one or more of the problems due to limitations and disadvantages of the related art.

SUMMARY OF THE INVENTION

An advantage of the invention is to provide an array substrate for a liquid crystal display device includes a substrate, first and second gate lines along a first direction on the substrate, first, second and third data lines along a second direction and crossing the first and second gate lines to define first and second pixel regions, first and second thin film transistors at a crossing portion of the second gate line and the first data line and at a crossing portion of the second gate line and the second data line, respectively, first and second pixel electrodes in the first and second pixel regions, respectively, the first pixel electrode connected to the first thin film transistor and the second pixel electrode connected to the second thin film transistor, and first and second common lines between the first and second gate lines, the first and second common lines overlapping the first and second pixel electrodes, respectively, and connected to each other under the second data line to cover a part of the second data line between the first and second gate lines.

In another aspect, a method of manufacturing an array substrate for a liquid crystal display device includes steps of defining first and second switching regions, first and second pixel regions, first and second common regions, and first, second and third data regions on a substrate, forming first and second gate lines, first and second gate electrodes, and first and second common lines on the substrate, wherein the first and second gate lines are formed along a first direction, the first and second gate electrodes are connected to the second gate line, and the first and second common lines are disposed in the first and second common regions, respectively, forming a gate insulating layer on the first and second gate lines, the first and second gate electrodes, and the first and second common lines, forming first and second semiconductor layers on the gate insulating layer over the first and second gate electrodes, forming first, second and third data lines, first and second source electrodes, and first and second drain electrodes over the first and second semiconductor layers, wherein the first, second and third data lines are formed along a second direction and cross the first and second gate lines to define the first and second pixel regions, the first source and drain electrodes are spaced apart from each other over the first semiconductor layer, and the second source and drain electrodes are spaced apart from each other over the second semiconductor layer, forming a passivation layer on the first, second and third data lines, the first and second source electrodes, and the first and second drain electrodes, the passivation layer including first and second contact holes that expose the first and second drain electrodes, respectively, and forming first and second pixel electrodes on the passivation layer, the first pixel electrode connected to the first drain electrode through the first contact hole, and the second pixel electrode connected to the second drain electrode through the second contact hole, wherein the first and second common lines overlap the first and second pixel electrodes, respectively and are connected to each other under the second data line to cover a part of the second data line between the first and second gate lines.

In another aspect, an array substrate for a liquid crystal display device includes a substrate, a gate line along a first direction on the substrate, a data line along a second direction and crossing the gate line to define a pixel region, a thin film transistor at a crossing portion of the gate line and the data line, a pixel electrode in the pixel region and connected to the thin film transistor, and a common line between adjacent gate lines and overlapping the pixel electrode, the common line including a horizontal portion along the first direction and first and second vertical portions along the second direction, wherein the first vertical portion of the common line directly contacts a second vertical portion of a common line in a next pixel region under the data line to thereby cover a part of the data line between the adjacent gate lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A to 5H are cross-sectional views of an array substrate corresponding to the line V-V' of FIG. 4.

DETAILED DESCRIPTION OF THE ILLUSTRATED EMBODIMENTS

Reference will now be made in detail to embodiments of the present invention, examples of which are illustrated in the accompanying drawings.

In the present invention, a part of a data line between adjacent gate lines entirely overlaps a common line.

Figure 4:
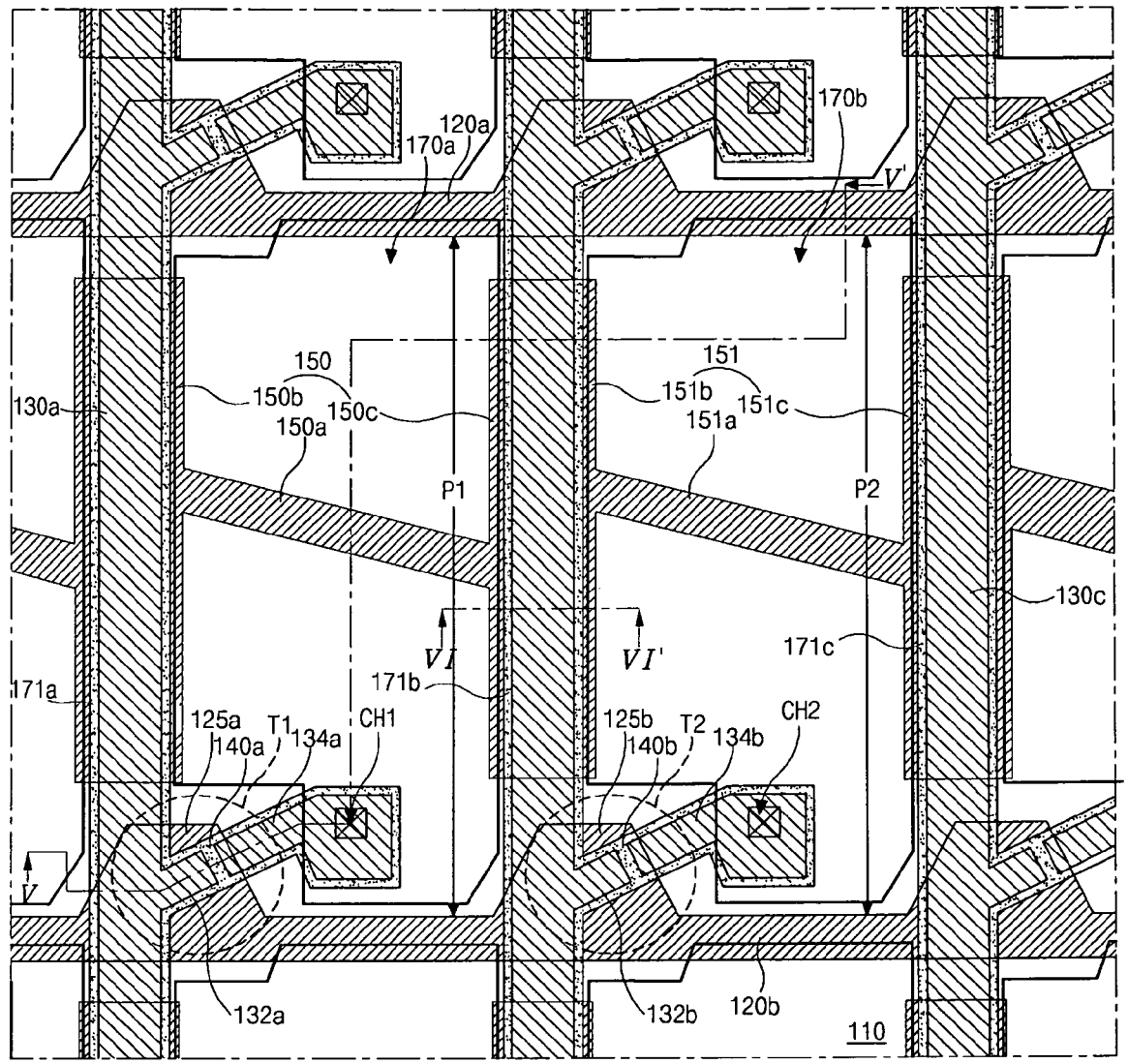
FIG. 4 is a plan view illustrating an array substrate for an SOC-type LCD device according to an exemplary embodiment of the present invention.

FIG. 4 is a plan view illustrating an array substrate for an SOC-type LCD device according to an exemplary embodiment of the present invention.

In FIG. 4, first and second gate lines 120a and 120b and first, second, third data lines 130a, 130b and 130c are formed on a substrate 110 in a matrix shape. The first, second and third data lines 130a, 130b and 130c cross the first and second gate lines 120a and 120b to define first and second pixel regions P1 and P2. Scan signals are applied to the first and second gate lines 120a and 120b, and data signals are applied to the first, second and third data lines 130a, 130b and 130c.

First and second common lines 150 and 151 are formed between the first and second gate lines 120a and 120b. Each of the first and second common lines 150 and 151 has an H-like shape.

The first common line 150 includes a horizontal part 150a and first and second vertical parts 150b and 150c. The horizontal part 150a is disposed between the first and second gate lines 120a and 120b and between the first and second data lines 130a and 130b. That is, the horizontal part 150a is disposed in the first pixel region P1 along a horizontal direction in the context of the figure. The first and second vertical parts 150b and 150c extend from respective ends of the horizontal part 150a along a vertical direction in the context of the figure. The first and second vertical parts 150b and 150c are parallel with the data lines 130a, 130b and 130c and are adjacent to the first and second data lines 130a and 130b, respectively.

The second common line 151 also includes a horizontal part 151a and first and second vertical parts 151b and 151c. The horizontal part 151a is disposed between the first and second gate lines 120a and 120b and between the second and third data lines 130b and 130c. That is, the horizontal part 151a is disposed in the second pixel region P2 along the horizontal direction in the context of the figure. The first and second vertical parts 151b and 151c extend from respective ends of the horizontal part 151a along the vertical direction in the context of the figure. The first and second vertical parts 151b and 151c are parallel with the data lines 130a, 130b and 130c and are adjacent to the second and third data lines 130b and 130c, respectively.

The horizontal part 150a of the first common line 150 and the horizontal part 151a of the first common line 151 may be slant with respect to the first and second gate lines 120a and 120b.

Here, the second vertical part 150c of the first common line 150 and the first vertical part 151b of the second common line 151 overlap the second data line 130b between the first gate line 120a and the second gate line 120b. The second vertical part 150c of the first common line 150 and the first vertical part 151b of the second common line 151 cover the second data line 130b excluding parts that cross the first gate line 120a and the second gate line 120b.

Even though the first and second pixel regions P1 and P2 are described, the first and second common lines 150 and 151 cover the first, second and data lines 130a, 130b and 130c excluding parts that correspond to the thin film transistors of the pixel regions without the common bridge lines, which connect the common lines of adjacent pixel regions. A common signal from a common signal generating unit (not shown) is stably applied to the common lines of the pixel regions.

A first thin film transistor T1 is formed at a crossing portion of the second gate line 120b and the first data line 130a. A second thin film transistor T2 is formed at a crossing portion of the second gate line 120b and the second data line 130b.

The first thin film transistor T1 includes a first gate electrode 125a, a first semiconductor layer (not shown), a first source electrode 132a and a first drain electrode 134a. The first gate electrode 125a extends from the second gate line 120b into the first pixel region P1. The first semiconductor layer (not shown) overlaps and is disposed over the first gate electrode 125a. The first source electrode 132a extends from the first data line 130a and is disposed over the first semiconductor layer. The first drain electrode 134a is spaced apart from the first source electrode 132a.

The second thin film transistor T2 includes a second gate electrode 125b, a second semiconductor layer (not shown), a second source electrode 132b and a second drain electrode 134b. The second gate electrode 125b extends from the second gate line 120b into the second pixel region P2. The second semiconductor layer (not shown) overlaps and is disposed over the second gate electrode 125b. The second source electrode 132b extends from the second data line 130b and is disposed over the second semiconductor layer. The second drain electrode 134b is spaced apart from the second source electrode 132b.

The first semiconductor layer includes a first active layer 140a of intrinsic amorphous silicon (a-Si:H) and a first ohmic contact layer (not shown) of impurity-doped amorphous silicon (n+ a-Si:H). The second semiconductor layer includes a second active layer 140b of intrinsic amorphous silicon (a-Si:H) and a second ohmic contact layer (not shown) of impurity-doped amorphous silicon (n+ a-Si:H).

First, second and third intrinsic amorphous silicon patterns 171a, 171b and 171c and first, second and third impurity-doped amorphous silicon patterns (not shown) are also formed under the first, second and third data lines 130a, 130b and 130c. The first, second and third intrinsic amorphous silicon patterns 171a, 171b and 171c are formed on the same layer and of the same material as the first and second active layers 140a and 140b. The first, second and third impurity-doped amorphous silicon patterns are formed on the same layer and of the same material as the first and second ohmic contact layers.

The first, second and third intrinsic amorphous silicon patterns 171a, 171b and 171c have wider widths than the first, second and third data lines 130a, 130b and 130c, and thus parts of the first, second and third intrinsic amorphous silicon patterns 171a, 171b and 171c are exposed beyond edges of the first, second and third data lines 130a, 130b and 130c.

First and second contact holes CH1 and CH2 expose the first and second drain electrodes 134a and 134b, respectively.

First and second pixel electrodes 170a and 170b are formed in the first and second pixel regions P1 and P2, respectively. The first pixel electrode 170a contacts the first drain electrode 134a through the first drain contact hole CH1. The second pixel electrode 170b contacts the second drain contact hole 134b through the second drain contact hole CH2. The first and second pixel electrodes 170a and 170b are formed of one selected from a transparent conductive material group including indium tin oxide (ITO) and indium zinc oxide (IZO). The first and second pixel electrodes 170a and 170b partially overlap the first gate line 120a.

A first storage capacitor Cst1 is formed, wherein the horizontal part 150a and the first and second vertical parts 150b and 150c of the first common line 150 function as a first electrode of the first storage capacitor Cst1, the first pixel electrode 170a overlapping the first electrode functions as a second electrode of the first storage capacitor Cst1, and an insulating layer (not shown) interposed between the first and second electrodes functions as a dielectric layer.

In addition, a second storage capacitor Cst2 is formed, wherein the horizontal part 151a and the first and second vertical parts 151b and 151c of the second common line 151 function as a first electrode of the second storage capacitor Cst2, the second pixel electrode 170b overlapping the first electrode functions as a second electrode of the second storage capacitor Cst2, and an insulating layer (not shown) interposed between the first and second electrodes of the second storage capacitor Cst2 functions as a dielectric layer.

A method of manufacturing an array substrate for an SOC-type LCD device according to the present invention will be explained with reference to accompanying drawings.

FIGS. 5A to 5H are cross-sectional views of an array substrate corresponding to the line V-V' of FIG. 4 and show cross-sections in steps of manufacturing an array substrate for an SOC-type LCD device according to the present invention.

FIG. 5A shows the array substrate in a first mask process. In FIG. 5A, a first switching region S1, first and second pixel regions P1 and P2, first and second common regions C1 and C2, a first gate region G1 and a second data region D2 are defined on a substrate 110. A first gate line 120a, a second gate line 120b, a first gate electrode 125a and a second gate electrode 125b of FIG. 4 are formed on the substrate 110 including the regions S1, P1, P2, C1, C2, G1 and D2 by depositing a gate metal layer (not shown) and then patterning the gate metal layer. At the same time, a first common line 150 and a second common line 151 are formed on the substrate 110. The first gate line 120a and the second gate line 120b are formed along a first direction. The first gate line 120a and the second gate line 120b are spaced apart from and parallel with each other. The first gate electrode 125a and the second gate electrode 125b of FIG. 4 extend from the second gate line 120b. Also, gate electrodes (not shown) extend from the first gate line 120a. The first common line 150 corresponds to the first common region C1, and the second common line 151 corresponds to the second common region C2.

The first common line 150 includes a horizontal part 150a, a first vertical part 150b of FIG. 4 and a second vertical part 150c. The horizontal part 150a is formed along the first direction and is disposed in the first pixel region P1 between the first and second gate lines 120a and 120b. The first vertical part 150b of FIG. 4 and the second vertical part 150c extend from respective ends of the horizontal part 150a along a second direction. The second vertical part 150c is disposed in the second data region D2.

The second common line 151 includes a horizontal part 151a of FIG. 4, a first vertical part 151b and a second vertical part 151c of FIG. 4. The horizontal part 151a is formed along the first direction and is disposed in the second pixel region P2 between the first and second gate lines 120a and 120b. The first vertical part 151b and the second vertical part 151c of FIG. 4 extend from respective ends of the horizontal part 151a along the second direction. The first vertical part 151b is disposed in the second data region D2.

Here, the second vertical part 150c of the first common line 150 and the first vertical part 151b of the second common line 151 entirely covers the second data region D2 excluding a crossing region of the first gate line 120a and a second data line to be formed later and a crossing region of the second gate line 120b and the second data line, that is, the first switching region S1 and another switching region (not shown). More particularly, the second vertical part 150c of the first common line 150 and the first vertical part 151b of the second common line 151 contact each other in the second data region D2.

Accordingly, the first and second common lines 150 and 151 are electrically connected to other common lines in pixel regions adjacent to the first and second pixel regions P1 and P2. A common signal from a common signal generating unit (not shown) is stably applied to the common lines.

Next, a gate insulating layer 145 is formed on a substantially entire surface of the substrate 110 including the first gate line 120a, the second gate line 120b, the first gate electrode 125a, the second gate electrode 125b, the first common line 150 and the second common line 151. The gate insulating layer 145 may be formed of one selected from an inorganic insulating material group including silicon oxide ($SiO_2$) and silicon nitride ($SiN_x$).

FIGS. 5B to 5H show the array substrate in a second mask process.

In FIG. 5B, an intrinsic amorphous silicon layer 140a and an impurity-doped amorphous silicon layer 141a are sequentially formed on the substrate 110 including the gate insulating layer 145. The intrinsic amorphous silicon layer 140a is formed of intrinsic amorphous silicon (a-Si:H), and the impurity-doped amorphous silicon layer 141a is formed of amorphous silicon including impurities (n+ a-Si:H). A source and drain metal layer 175 is formed on the substrate 110 including the intrinsic amorphous silicon layer 140a and the impurity-doped amorphous silicon layer 141a by depositing a metallic material. The metallic material may be selected from a conductive metallic material group including copper (Cu), molybdenum (Mo), molybdenum alloy (MoNd), aluminum (Al) and aluminum alloy (AlNd).

That is, the intrinsic amorphous silicon layer 140a, the impurity-doped amorphous silicon layer 141a and the source and drain metal layer 175 are sequentially formed on the gate insulating layer 145 by a deposition process.

Next, a photoresist layer 190 is formed by applying photoresist to the substrate 110 including the intrinsic amorphous silicon layer 140a, the impurity-doped amorphous silicon layer 141a and the source and drain metal layer 175, and a mask HTM is disposed over the photoresist layer 190.

The mask HTM includes a light-transmitting portion M1, a half light-transmitting portion M2 and a light-blocking portion M3. The half light-transmitting portion M2 may include a semitransparent layer or slits for reducing the intensity or amount of transmitted light such that a photoresist layer is partially exposed to light. The mask HTM including the semitransparent layer may be referred to as a halftone mask, and the mask HTM including the slits may be referred to as a slit mask. The light-blocking portion M3 completely screens light. The light-transmitting portion M1 transmits light, and a photoresist layer is entirely exposed to light and is chemically changed.

The half light-transmitting portion M2 and the light-blocking portion M3 correspond to the first switching region S1 such that the half light-transmitting portion M2 is disposed between adjacent parts of the light-blocking portion M3. The light-blocking portion M3 also corresponds to the second data region D2. The light-transmitting portion M1 corresponds to other regions excluding the first switching region S1 and the second data region D2. Meanwhile, the mask HTM is disposed over a second switching region (not shown) corresponding to the second thin film transistor T2 of FIG. 4, a first data region (not shown) corresponding to the first data line 130a, and a third data region (not shown) corresponding to the third data line 130c in the same way as the first switching region S1 and the second data region D2 of FIG. 5B. Hereinafter, explanation of the second switching region and the first and third data regions will be omitted.

Figure 5C:
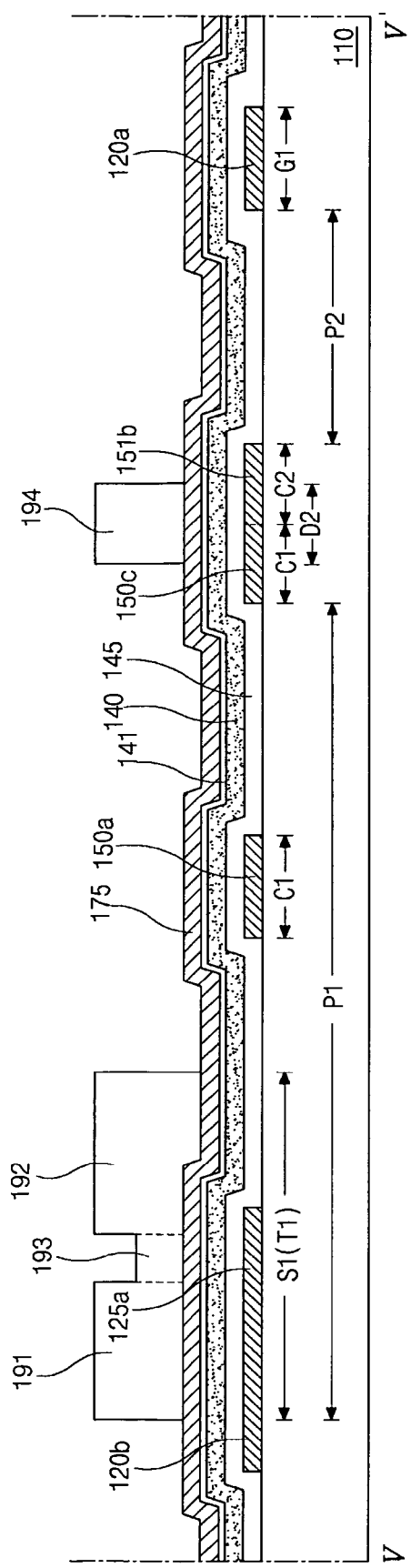

In FIG. 5C, the photoresist layer 190 of FIG. 5B is exposed to light through the mask HTM of FIG. 5B and then is developed, thereby forming first, second, third and fourth photoresist patterns 191, 192, 193 and 194. The first and second photoresist patterns 191 and 192 are formed in the first switching region S1 corresponding to the light-blocking portion M3 of FIG. 5B. The third photoresist pattern 193 is formed in the first switching region S1 corresponding to the half light-transmitting portion M2 of FIG. 5B. The fourth photoresist pattern 194 is formed in the second data region D2. The first, second and fourth photoresist patterns 191, 192 and 194 have a first thickness that is substantially same as a thickness of the photoresist layer 190 of FIG. 5B. The third photoresist pattern 193 has a second thickness smaller than the first thickness. The second thickness may be half of the first thickness. In other regions excluding the first switching region S1 and the second data region D2, parts of the photoresist layer 190 of FIG. 5B are removed, and the source and drain metal layer 175 is exposed.

Figure 5D:
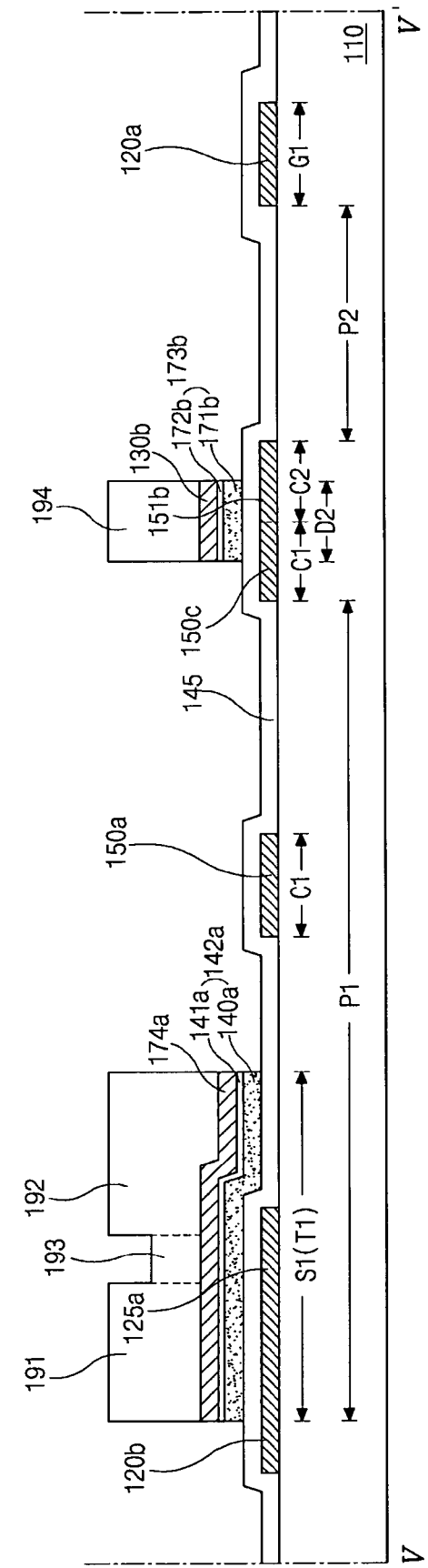

In FIG. 5D, the exposed source and drain metal layer 175 of FIG. 5C is patterned by using the first, second, third and fourth photoresist patterns 191, 192, 193 and 194 as an etching mask, and thus a first source and drain metal pattern 174a and a second data line 130b are formed in the first switching region S1 and the second data region D2, respectively. The second data line 130b crosses the first and second gate lines 120a and 120b.

Here, the source and drain metal layer 175 of FIG. 5C is removed in regions excluding the first source and drain metal layer 175 and the second data line 130b, and thus the impurity-doped amorphous silicon layer 141a of FIG. 5C is exposed.

Next, the exposed impurity-doped amorphous silicon layer 141a of FIG. 5C and the intrinsic amorphous silicon layer 140a of FIG. 5C are removed and patterned by a dry etch method, thereby forming a first active layer 140a, a first ohmic contact layer 141a, a second intrinsic amorphous silicon pattern 171b and a second impurity-doped amorphous silicon pattern 172b. At this time, the first active layer 140a and the ohmic contact layer 141a are disposed under the first source and drain metal pattern 174a in the first switching region S1 and have the same size and the same shape as the first source and drain metal pattern 174a. The second intrinsic amorphous silicon pattern 171b and the second impurity-doped amorphous silicon pattern 172b are under the second data line 130b in the second data region D2 and have the same size and the same shape as the second data line 130b.

The first active layer 140a and the first ohmic contact layer 141a constitute a first semiconductor layer 141a. The second intrinsic amorphous silicon pattern 171b and the second impurity-doped amorphous silicon pattern 172b constitute a second semiconductor pattern 173b. Here, the intrinsic amorphous silicon layer 140a of FIG. 5C and the impurity-doped amorphous silicon layer 141a of FIG. 5C are removed in regions excluding the first semiconductor layer 142a and the second semiconductor pattern 173b. Meanwhile, although not shown in the figure, a first semiconductor pattern and a third semiconductor pattern are formed under the first data line 130a of FIG. 4 and the third data line 130c of FIG. 4.

In FIG. 5E, a process of ashing the first, second, third and fourth photoresist patterns 191, 192, 193 and 194 of FIG. 5D is performed, and the third photoresist pattern 193 of FIG. 5D is removed to expose the first source and drain metal pattern 174a between the first and second photoresist patterns 191 and 192. At this time, the first, second and fourth photoresist patterns 191, 192 and 194 are partially removed, and the first thickness of the first, second and fourth photoresist patterns 191, 192 and 194 is decreased by half.

In the meantime, edges of the first, second and fourth photoresist patterns 191, 192 and 194 are also removed to expose edges F of the first source and drain metal pattern 174a and the second data line 130b. In addition, a distance between the first and second photoresist patterns 191 and 192 becomes larger than a width of the third photoresist pattern 193 of FIG. 5D.

In FIG. 5F, a first source electrode 132a and a first drain electrode 134a are formed by patterning the first source and drain metal pattern 174a of FIG. 5E using the first, second and fourth photoresist patterns 191, 192 and 194 of FIG. 5E as an etching mask. The first source electrode 132a and the first drain electrode 134a are spaced apart from each other. The first source and drain metal pattern 174a of FIG. 5E may be patterned by a wet etch method. Next, the first ohmic contact layer 141a between the first source electrode 132a and the first drain electrode 134a is removed by using the first source electrode 132a and the first drain electrode 134a as an etching mask, thereby forming separated two parts of the first ohmic contact layer 141a and exposing the first active layer 140a between the two parts of the first ohmic contact layer 141a. The exposed first active layer 140a functions as a first channel ch1. The exposed first active layer 140a may be partially removed.

At this time, the edges F of the first source and drain metal pattern 174a and the second data line 130b and the first ohmic contact layer 141a and the first impurity-doped amorphous silicon pattern 172 thereunder are also removed, and edges of the first active layer 140a and the first amorphous silicon pattern 171a are exposed beyond the first source electrode 132a, the first drain electrode 134a and the second data line 130b. The first gate electrode 125a, the first semiconductor layer 142a, the first source electrode 132a and the first drain electrode 134a constitute a first thin film transistor T1.

Next, the remaining first, second and fourth photoresist patterns 191, 192 and 194 of FIG. 5E are removed by a strip process.

Figure 5G:
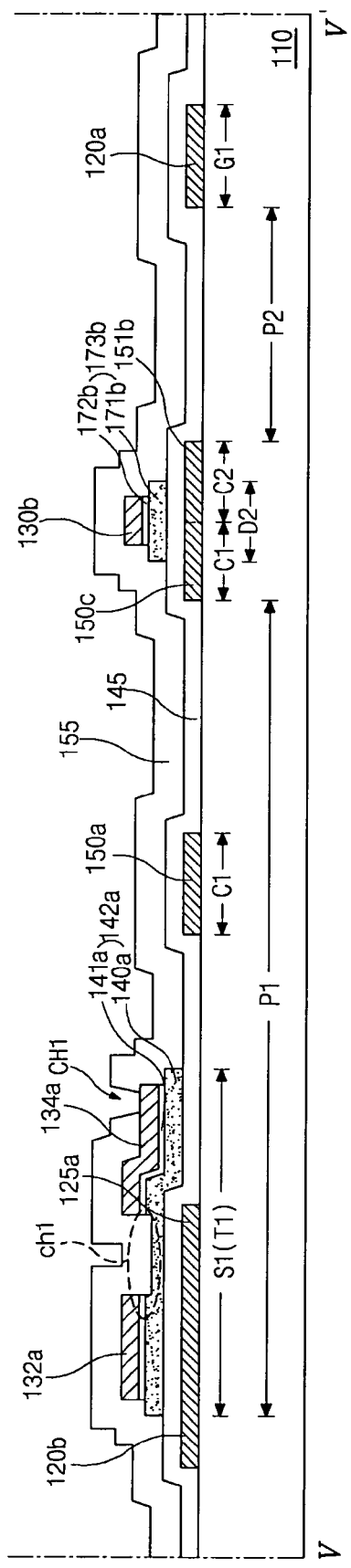

FIG. 5G shows the array substrate in a third mask process.

In FIG. 5G, a passivation layer 155 is formed on a substantially entire surface of the substrate 110 including the second data line 130b and the first thin film transistor T1. The passivation layer 155 may be formed of one selected from an inorganic insulating material group including silicon nitride ($SiN_x$) and silicon oxide ($SiO_2$) or an organic insulating material group including benzocyclobutene (BCB) and photo acryl.

The passivation layer 155 corresponding to the first drain electrode 134a and the second drain electrode 134b of FIG. 4 is selectively patterned to form a first drain contact hole CH1 and a second drain contact hole CH2 of FIG. 4. The first drain contact hole CH1 exposes the first drain electrode 134a, and the second drain contact hole CH2 of FIG. 4 exposes the second drain electrode 134b of FIG. 4.

Figure 5H:
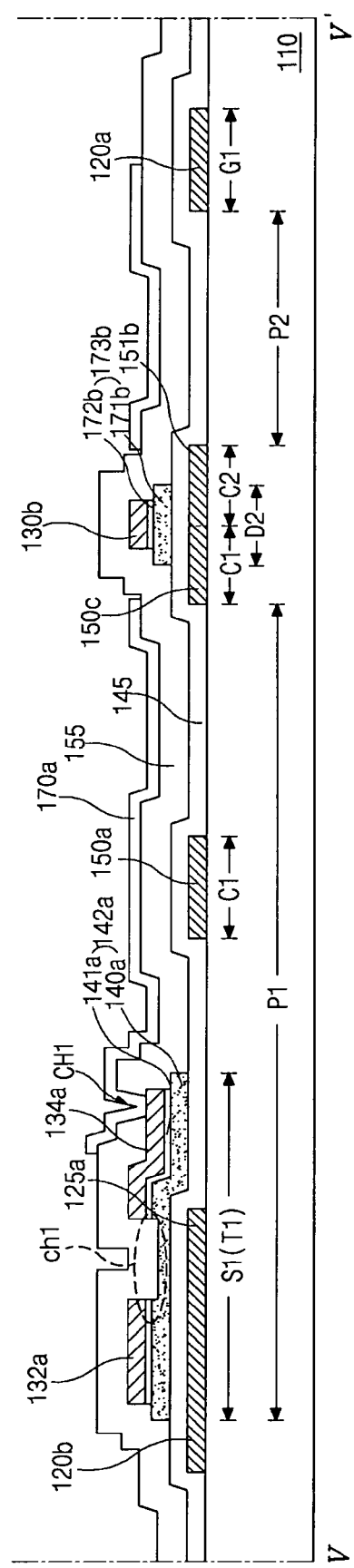

FIG. 5H shows the array substrate in a fourth mask process.

In FIG. 5H, a first pixel electrode 170a and a second pixel electrode 170b are formed on the passivation layer 155 including the first drain contact hole CH1 and the second drain contact hole CH2 of FIG. 4 by depositing a transparent conductive layer (not shown) and then pattering the transparent conductive layer. The first pixel electrode 170a is disposed in the first pixel region P1 and is connected to the first drain electrode 134a through the first drain contact hole CH1. The second pixel electrode 170b is disposed in the second pixel region P2 and is connected to the second drain electrode 134b of FIG. 4 through the second contact hole CH2 of FIG. 4. The transparent conductive layer may be selected from a transparent conductive material group including indium tin oxide (ITO) and indium zinc oxide (IZO).

At this time, referring to FIG. 4 and FIG. 5H, a first storage capacitor Cst1 and a second storage capacitor Cst2 are formed. The first storage capacitor Cst1 includes the horizontal part 150a and the first and second vertical parts 150b and 150c of the first common line 150 as a first electrode, the first pixel electrode 170a overlapping the first electrode as a second electrode, and the gate insulating layer 145 and the passivation layer 155 interposed between the first and second electrodes as a dielectric layer.

In addition, the second storage capacitor Cst2 includes the horizontal part 151a and the first and second vertical parts 151b and 151c of the second common line 151 as a first electrode, the second pixel electrode 170b overlapping the first electrode as a second electrode, and the gate insulating layer 145 and the passivation layer 155 interposed between the first and second electrodes as a dielectric layer.

Like this, the array substrate for an SOC-type LCD device according to the present invention may be manufactured by four mask processes.

Figure 6:
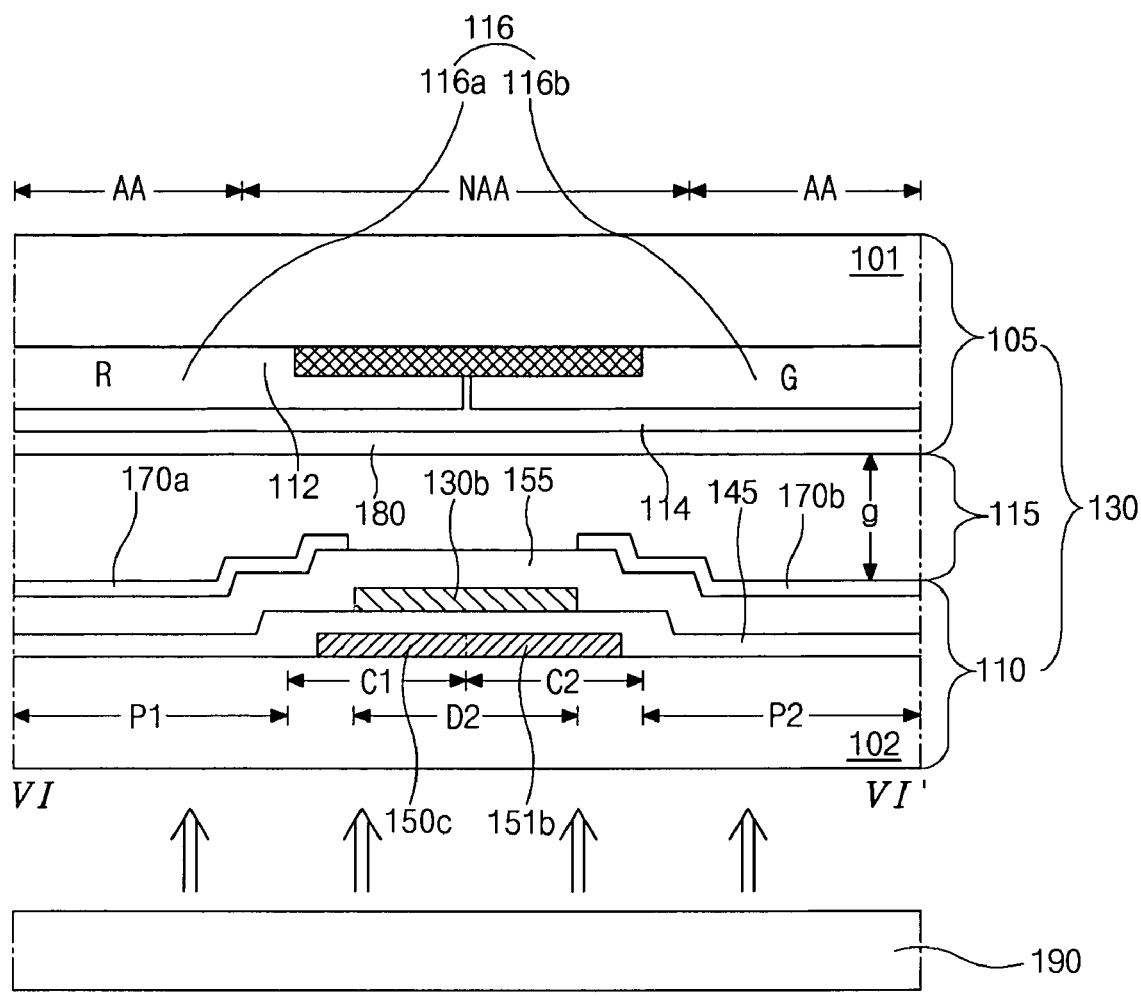
FIG. 6 is a cross-sectional view of an SOC-type LCD device according to the present invention and corresponds to a cross-section taken along the line VI-VI' of FIG. 4.

FIG. 6 is a cross-sectional view of an SOC-type LCD device according to the present invention and corresponds to a cross-section taken along the line VI-VI' of FIG. 4.

In FIG. 6, a color filter substrate 105 and an array substrate 110 are facing each other and attached with a cell gap g therebetween. Each of the color filter substrate 105 and the array substrate 110 includes a display area AA and a non-display area NAA. A liquid crystal layer 115 is interposed between the color filter substrate 105 and the array substrate 110. The liquid crystal layer 115 has a thickness corresponding to the cell gap g. The color filter substrate 105, the array substrate 110 and the liquid crystal layer 115 constitute a liquid crystal panel 130. A backlight unit 190 is disposed at a rear surface of the array substrate 110 as a light source.

Even though not shown in the figure, a seal pattern is formed between the color filter substrate 105 and the array substrate 110 along peripheries. The seal pattern may be formed of a thermosetting resin.

The color filter substrate 105 includes a transparent substrate 101, a black matrix 112, a color filter layer 116, an overcoat layer 114 and a common electrode 180. The black matrix 112 is formed at a lower surface of the transparent substrate 101 and screens light incident on the non-display area NAA. The color filter layer 116 is formed on the black matrix 112 and includes a red sub color filter 116a, a green sub color filter 116b and a blue sub color filter (not shown) that are subsequently patterned. The overcoat layer 114 is formed on the color filter layer 116. The common electrode 180 is formed on the overcoat layer 114 and is formed of a transparent conductive material.

The array substrate 110 includes a transparent substrate 102, a second vertical part 150c of a first common line 150, the first vertical part 151b of the second common line 151, the gate insulating layer 145, the second data line 130b, the passivation layer 155, and the first and second pixel electrodes 170a and 170b. The second vertical part 150c of the first common line 150 and the first vertical part 151b of the second common line 151 are formed on an upper surface of the transparent substrate 102 and contact each other to cover the second data region D2. The gate insulating layer 145 covers the second vertical part 150c of the first common line 150 and the first vertical part 151b of the second common line 151. The second data line 130b is disposed in the second data line D2 on the gate insulating layer 145. The passivation layer 155 covers the second data line 130b. The first and second pixel electrodes 170a and 170b are formed on the passivation layer 155 in the first and second pixel regions P1 and P2, respectively, such that the second data line 130b is disposed therebetween.

In the SOC-type LCD device according to the present invention, since the second vertical part 150c of the first common line 150 and the first vertical part 151b of the second common line 151 are designed to contact each other under the second data line 130b, the common bridge lines are not needed.

Figure 1:
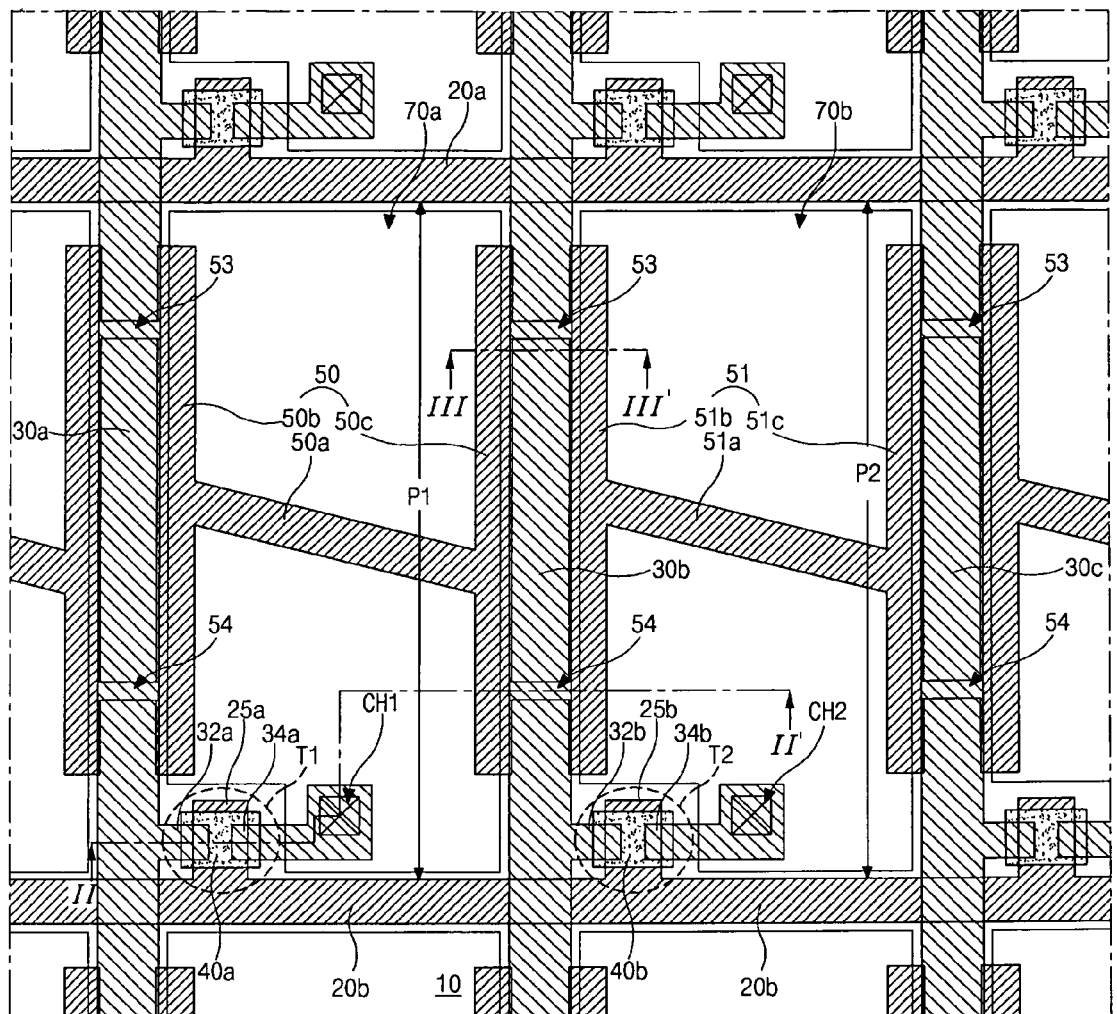
FIG. 1 is a plan view illustrating an array substrate for an SOC-type LCD device according to the related art.
Figure 2:
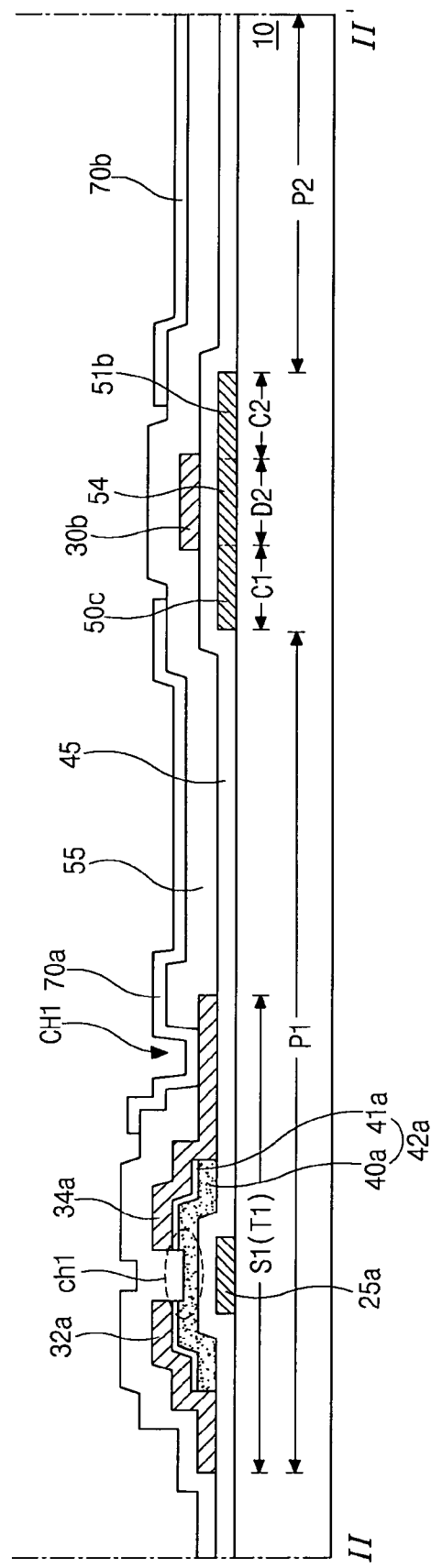
FIG. 2 is a cross-sectional view taken along the line II-II' of FIG. 1.
Figure 3:
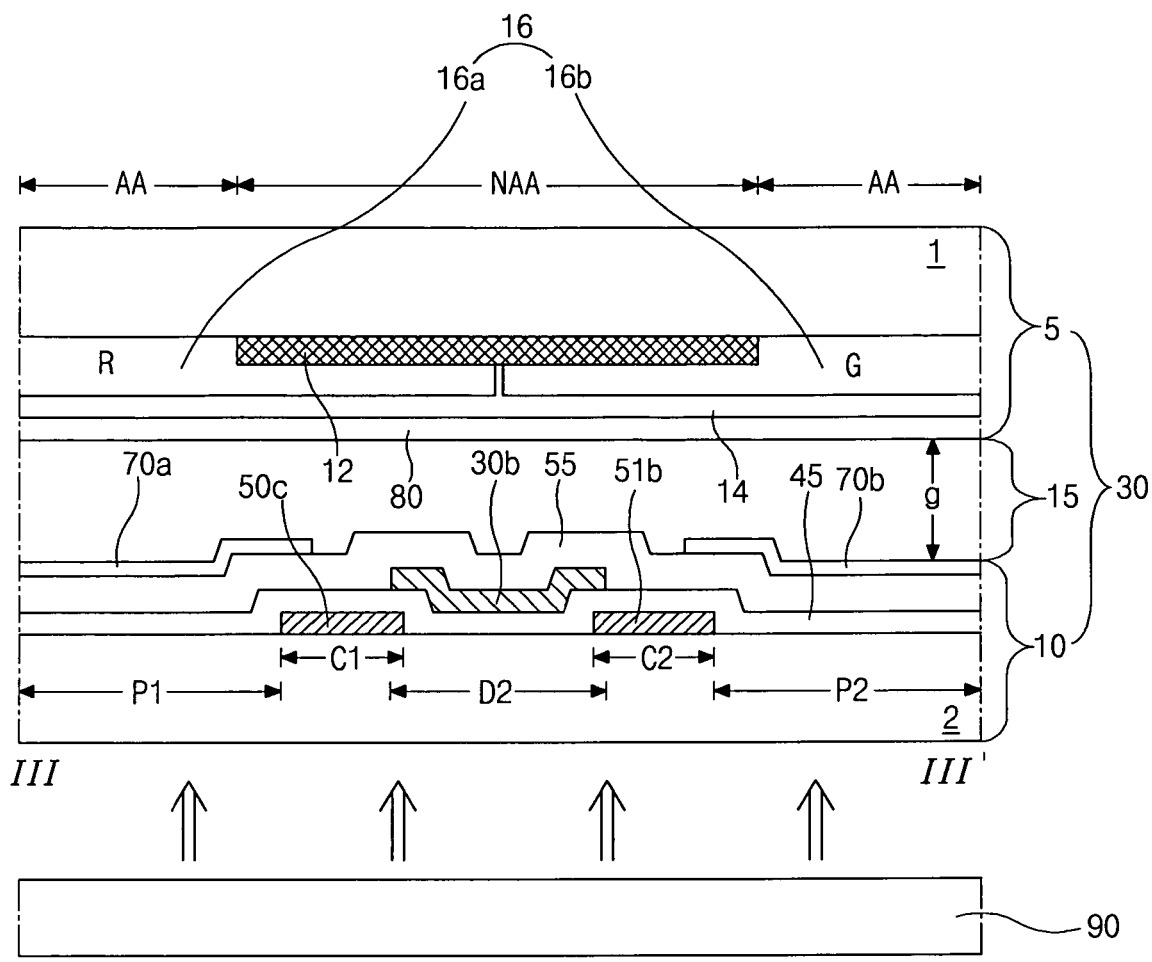
FIG. 3 is a cross-sectional view of an SOC-type LCD device according to the related art and corresponds to a cross-section taken along the line III-III' of FIG. 1.

That is, in the related art of FIG. 3, the second vertical part 50c of the first common line 50 and the first vertical part 51b of the second common line 51 are disposed at both sides of the second data line 30b and spaced apart from each other to minimize an overlapping area between the second data line 30 and the second vertical part 50c of the first common line 50 and an overlapping area between the second data line 30 and the first vertical part 50b of the second common line 51.

On the other hand, in the present invention, the second vertical part 150c of the first common line 150 and the first vertical part 151b of the second common line 151 are formed to contact each other under the second data line 130b, and thus it is possible to decrease areas that the first common line 151 and the second common line 151 occupy in the first and second pixel regions P1 and P2, respectively.

Accordingly, the first pixel electrode 170a and the second pixel electrode 170b are designed to be closer to the second data line 130b, and sizes of the first pixel electrode 170a and the second pixel electrode 170b in the first and second pixel regions P1 and P2 increase. This causes a decrease in a width of the black matrix 112 as compared with the related art even if an attachment margin is considered. Therefore, the aperture ratio is increased.

Particularly, remarkable effects can be obtained when the SOC-type LCD device according to the present invention is applied to a small-sized device of less than 10 inches.

Table 1 shows aperture ratios and transmittances of SOC-type LCD devices according to the related art and the present invention. Here, the devices have a 7 inch size.

TABLE 1

|    | related art | present invention |
|----|-------------|-------------------|
| L1 | 42.5%       | 60.9%             |
| L2 | 42.5%       | 58.9%             |
| L3 | 6.04%       | 8.36%             |

In table 1, L1 and L2 show a percentage of the aperture ratio when light from the backlight unit is provided to the liquid crystal panel. L1 is a maximum value in deviation of the aperture ratio of the related art and the present invention, and the aperture ratio of the present invention increases by 18.5% in comparison to the related art. L2 is an average value of the aperture ratio of the related art and the present invention, and the aperture ratio of the present invention increases by 16.4% as compared with the related art.

Meanwhile, L3 shows a percentage of an average value of the transmittance of an LCD device including the liquid crystal panel, polarizers and optical sheets. The transmittance of the present invention increases by 2.32% in comparison to the related art.

In the present invention, the first common line and the second common line contacts each other in the data line, and thus the aperture ratio of the SOC-type LCD device is maximized.

Even though the first and second pixels are described as an embodiment of the present invention, the first and second pixels may have the same structure, and one pixel structure may be repeatedly included. More particularly, a gate line and a data line cross each other and define a pixel region. A thin film transistor is connected to the gate and data lines. A pixel electrode is formed in the pixel region and is connected to the thin film transistor. A common line including a horizontal portion.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
    a substrate;
    first and second gate lines along a first direction on the substrate;
    first, second and third data lines along a second direction and crossing the first and second gate lines to define first and second pixel regions;
    first and second thin film transistors at a crossing portion of the second gate line and the first data line and at a crossing portion of the second gate line and the second data line, respectively;
    first and second pixel electrodes in the first and second pixel regions, respectively, the first pixel electrode connected to the first thin film transistor and the second pixel electrode connected to the second thin film transistor; and
    first and second common lines between the first and second gate lines, the first and second common lines overlapping the first and second pixel electrodes, respectively, and connected to each other under the second data line without a gap therebetween to cover a part of the second data line between the first and second gate lines,
    wherein the first and second common lines each have two sides extending from the first and second common lines and parallel to the second direction, respectively, and an entire side of the first common line directly contacts an entire side of the second common line,
    wherein the sides of the first and second common lines directly contacting each other have a same length as a maximum length of the first and second common lines along the second direction,
    wherein a channel between source and drain electrodes of each of the first and second thin film transistors has an angle larger than 0 degree and smaller than 90 degrees with respect to the first direction,
    wherein each of the first common line and the second common line includes a horizontal portion, a first vertical portion, and a second vertical portion, the horizontal portion disposed along the first direction, the first and second vertical portions extending from the horizontal portion along the second direction,
    wherein the first vertical portion has two ends along the second direction, and the second vertical portion has two ends along the second direction, wherein a first distance from one end of the first vertical portion to a connecting portion between the first vertical portion and the horizontal portion is shorter than a second distance from the other end of the first vertical portion to the connecting portion between the first vertical portion and the horizontal portion, wherein a third distance from one end of the second vertical portion to a connecting portion between the second vertical portion and the horizontal portion is longer than a fourth distance from the other end of the second vertical portion to the connecting portion between the second vertical portion and the horizontal portion.

2. The array substrate according to claim 1, wherein the first and second vertical portions of the first common line overlap the first and second data lines, respectively, the first and second vertical portions of the second common line overlap the second and third data lines, respectively.

3. The array substrate according to claim 2, wherein the second vertical portion of the first common line directly contacts the first vertical portion of the second common line under the second data line.

4. The array substrate according to claim 2, wherein the horizontal portion and the first and second vertical portions of the first common line as a first electrode, the first pixel electrode as a second electrode, and an insulating layer interposed therebetween constitute a first storage capacitor.

5. The array substrate according to claim 4, wherein the horizontal portion and the first and second vertical portions of the second common line as a first electrode, the second pixel electrode as a second electrode, and an insulating layer interposed therebetween constitute a second storage capacitor.

6. A method of manufacturing an array substrate for a liquid crystal display device, comprising:
    defining first and second switching regions, first and second pixel regions, first and second common regions, and first, second and third data regions on a substrate;
    forming first and second gate lines, first and second gate electrodes, and first and second common lines on the substrate, wherein the first and second gate lines are formed along a first direction, the first and second gate electrodes are connected to the second gate line, and the first and second common lines are disposed in the first and second common regions, respectively;
    forming a gate insulating layer on the first and second gate lines, the first and second gate electrodes, and the first and second common lines;
    forming first and second semiconductor layers on the gate insulating layer over the first and second gate electrodes;
    forming first, second and third data lines, first and second source electrodes, and first and second drain electrodes over the first and second semiconductor layers, wherein the first, second and third data lines are formed along a second direction and cross the first and second gate lines to define the first and second pixel regions, the first source and drain electrodes are spaced apart from each other over the first semiconductor layer, and the second source and drain electrodes are spaced apart from each other over the second semiconductor layer;
    forming a passivation layer on the first, second and third data lines, the first and second source electrodes, and the first and second drain electrodes, the passivation layer including first and second contact holes that expose the first and second drain electrodes, respectively; and
    forming first and second pixel electrodes on the passivation layer, the first pixel electrode connected to the first drain electrode through the first contact hole, and the second pixel electrode connected to the second drain electrode through the second contact hole, wherein the first and second common lines overlap the first and second pixel electrodes, respectively, and are connected to each other under the second data line without a gap therebetween to cover a part of the second data line between the first and second gate lines, wherein the first and second common lines each have two sides extending from the first and second common lines and parallel to the second direction, respectively, and an entire side of the first common line directly contacts an entire side of the second common line, wherein the sides of the first and second common lines directly contacting each other have a same length as a maximum length of the first and second common lines along the second direction, wherein channels between the first source and drain electrodes and between the second source and drain electrodes have an angle larger than 0 degree and smaller than 90 degrees with respect to the first direction, wherein each of the first common line and the second common line includes a horizontal portion, a first vertical portion, and a second vertical portion, the horizontal portion disposed along the first direction, the first and second vertical portions extending from the horizontal portion along the second direction, wherein the first vertical portion has two ends along the second direction, and the second vertical portion has two ends along the second direction, wherein a first distance from one end of the first vertical portion to a connecting portion between the first vertical portion and the horizontal portion is shorter than a second distance from the other end of the first vertical portion to the connecting portion between the first vertical portion and the horizontal portion, wherein a third distance from one end of the second vertical portion to a connecting portion between the second vertical portion and the horizontal portion is longer than a fourth distance from the other end of the second vertical portion to the connecting portion between the second vertical portion and the horizontal portion.

7. The method according to claim 6, wherein the first and second vertical portions of the first common line overlap the first and second data lines, respectively, the first and second vertical portions of the second common line overlap the second and third data lines, respectively.

8. The method according to claim 7, wherein the horizontal portion and the first and second vertical portions of the first common line as a first electrode, the first pixel electrode as a second electrode, and an insulating layer interposed therebetween constitute a first storage capacitor.

9. The method according to claim 8, wherein the horizontal portion and the first and second vertical portions of the second common line as a first electrode, the second pixel electrode as a second electrode, and an insulating layer interposed therebetween constitute a second storage capacitor.

10. The method according to claim 6, wherein a step of forming the first and second semiconductor layers is performed in a same process as a step of forming the first, second and third data lines, the first and second source electrodes, and the first and second drain electrodes.

11. An array substrate for a liquid crystal display device, comprising:
a substrate;
a gate line along a first direction on the substrate;
a data line along a second direction and crossing the gate line to define a pixel region;
a thin film transistor at a crossing portion of the gate line and the data line;
a pixel electrode in the pixel region and connected to the thin film transistor; and
a common line between adjacent gate lines and overlapping the pixel electrode, the common line including a horizontal portion along the first direction and first and second vertical portions along the second direction, wherein the first vertical portion of the common line directly contacts a second vertical portion of a common line in a next pixel region under the data line without a gap therebetween to thereby cover a part of the data line between the gate line and a next gate line adjacent to the gate line, wherein the first and second vertical portions of the common line each have two sides parallel to the second direction, respectively, and an entire side of the first vertical portion of the common line directly contacts an entire side of the second vertical portion of the common line in the next pixel region, wherein the sides of the first and second vertical portions of the common line directly contacting each other have a same length as a maximum length of the common line along the second direction, wherein a channel between source and drain electrodes of the thin film transistor has an angle larger than 0 degree and smaller than 90 degrees with respect to the first direction, wherein the first vertical portion has two ends along the second direction, and the second vertical portion has two ends along the second direction, wherein a first distance from one end of the first vertical portion to a connecting portion between the first vertical portion and the horizontal portion is shorter than a second distance from the other end of the first vertical portion to the connecting portion between the first vertical portion and the horizontal portion, wherein a third distance from one end of the second vertical portion to a connecting portion between the second vertical portion and the horizontal portion is longer than a fourth distance from the other end of the second vertical portion to the connecting portion between the second vertical portion and the horizontal portion.

12. An array substrate for a liquid crystal display device, comprising:
a substrate;
a gate line along a first direction on the substrate;
a data line along a second direction and crossing the gate line to define a pixel region;
a thin film transistor at a crossing portion of the gate line and the data line;
a pixel electrode in the pixel region and connected to the thin film transistor; and
a common line between adjacent gate lines and overlapping the pixel electrode, wherein the common line includes a first portion and a second portion corresponding to the pixel region, wherein the first portion is parallel to and overlaps the data line, and the second portion is connected to the first portion and a first portion corresponding to a next pixel region, wherein a width of the first portion is wider than a width of the data line, wherein the first portion has first and second sides facing each other, extending from the second portion, and overlapping respective sides of the data line, wherein the first and second sides of the first portion have a same length as a maximum length of the common line along the second direction, wherein the second side of the first portion is directly connected to the first side of the first portion corresponding the area overlapping the data line, wherein a channel between source and drain electrodes of the thin film transistor has an angle larger than 0 degree and smaller than 90 degrees with respect to the first direction, wherein the first portion has two ends along the second direction, wherein a first distance from one end of the first portion to a connecting portion between the first portion and the second portion is shorter than a second distance from the other end of the first portion to the connecting portion between the first portion and the second portion, wherein a third distance from one end of the first portion corresponding to the next pixel region to a connecting portion between the first portion corresponding to the next pixel region and the second portion is longer than a fourth distance from the other end of the first portion corresponding to the next pixel region to the connecting portion between the first portion corresponding to the next pixel region and the horizontal portion.

13. The array substrate according to claim 12, wherein the first portion of the common line is disposed under the data line.

14. The array substrate according to claim 12, wherein the second portion of the common line as a first electrode, the pixel electrode as a second electrode, and an insulating layer interposed therebetween constitute a storage capacitor.

* * * * *